Feb. 21, 1967   L. D. BYLUND   3,305,351
TREATMENT OF ALUMINUM WITH ALUMINUM FLUORIDE PARTICLES
Filed Feb. 24, 1964
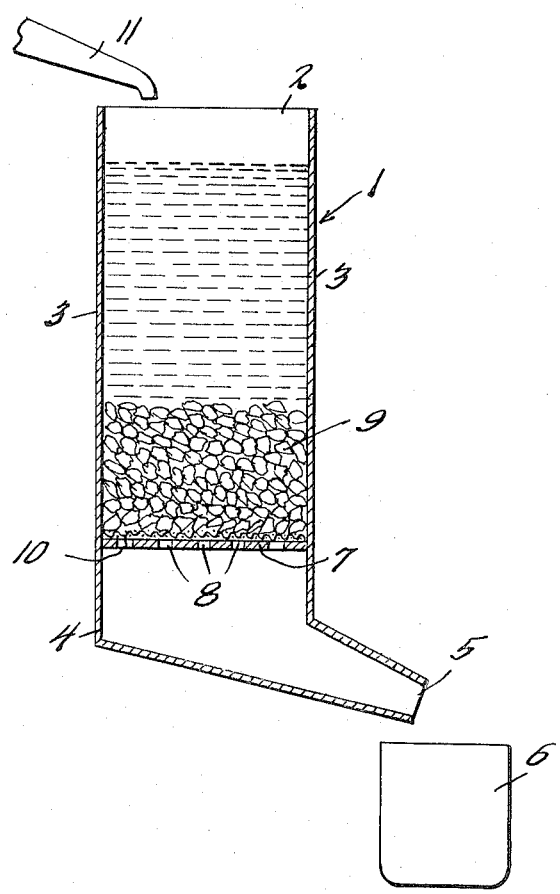
INVENTOR
Linton D. Bylund,
BY Glenn, Palmer & Matthews
ATTORNEYS

United States Patent Office 3,305,351
Patented Feb. 21, 1967

3,305,351
TREATMENT OF ALUMINUM WITH
ALUMINUM FLUORIDE PARTICLES
Linton D. Bylund, Chesterfield County, Va., assignor to Reynolds Metals Company, Richmond, Va., a corporation of Delaware
Filed Feb. 24, 1964, Ser. No. 346,625
9 Claims. (Cl. 75—68)

This invention relates to a novel method for purifying aluminum. More particularly, the invention concerns a system for removing lithium, sodium and magnesium in trace amounts from liquid aluminum by passing the aluminum through a bed of aluminum fluoride particles.

It has been found that very small amounts of lithium (e.g. 0.0005 percent, or even as little as 0.0003 percent) in dry annealed foil (over 99 percent aluminum) will cause the foil to corrode at an extremely rapid rate when foil is stored under humid conditions. This phenomenon is known as "blue corrosion" and in humid weather may occur within a day where such lithium content is in the foil. Sodium traces increase hot shortness effects during hot working operations on aluminum alloys, especially in the case of aluminum alloys in which magnesium is a substantial alloying element. Traces of magnesium should be held to a low upper limit in the case of condenser foil, for example, and are desirably held at a low upper limit in the case of any foil. It is highly desirable therefore to be able to reduce trace amounts of lithium, sodium and magnesium, substantially below the level at which they ordinarily occur in the aluminum as it comes from an electrolytic reduction cell or as it may otherwise be obtained, such as from remelted scrap.

Many filtering and fluxing treatments of molten aluminum have been tried in the past, and some are still practiced, such as filtering the molten aluminum through a bed of particles of alumina, with or without use of a stream of a reactive or nonreactive gas in conjunction with the filter bed. Merely fluxing with chlorine is a common practice. These known methods, however, do not provide a satisfactory means of substantially reducing the amount of trace impurities in the form of lithium, sodium and magnesium.

In accordance with the present invention this purpose is accomplished by a treatment utilizing particles of aluminum fluoride in contact with the molten aluminous metal. Particles of aluminum fluoride react with the trace elements of lithium, sodium and magnesium to form compounds which do not have the detrimental effects of the elemental metal impurities.

It is believed that the action of the aluminum fluoride involves reaction with lithium, sodium and magnesium, respectively, to form complex double salts. Thus, for example, lithium reacts with the aluminum fluoride to form a lithium analogue of cryolite, or the lithium and the sodium can both react with the aluminum fluoride to form lithium-sodium-aluminum fluoride (cryolithionite $3LiF \cdot 3NaF \cdot 2AlF_3$).

The size and shape of the aluminum fluoride particles are not critical for the purposes of the invention. Fine particles are not preferred, because of the practical difficulties of stirring them into the molten aluminum, and the practical difficulties of preventing them from flowing into a stream of purified aluminum. The fine particles can be caught on a glass filter cloth, in a batch operation, but after they accumulate on the cloth they tend to block the flow of molten metal. In the present preferred practice of the invention, the particles are in the form in which they come from a conventional converter, after separating out the fines. Such particles (e.g. passing a seven-eighth inch screen opening and held on a quarter inch screen opening) are large enough to form a bed through which molten aluminum flows readily, and small enough to have a sufficient surface area for reactive purposes while the molten aluminum is passing through the bed. The cost of making the particles (by treating alumina particles with hydrofluoric acid gas) can be reduced by treating them for a shorter period and consequently forming aluminum fluoride only as an outer shell around a core of alumina.

A form of apparatus suitable for the purposes of the invention is shown, for purposes of illustration only, in the accompanying drawing. As shown in the drawing, a tubular shell 1, has an open upper end 2, side walls 3, and an open lower end 4. A receiving container 6 is positioned to receive the metal passing out through lower spout 5. A rigid partition 7 extends across an intermediate portion of the passage through the shell, to support a bed of particles of aluminum fluoride 9. The partition 7 has a plurality of openings 8 through it, to allow passage of molten metal, and a fiberglass filter cloth 10 extends across and rests on the partition 7, beneath the particles 9. The cloth 10 can be of any mesh size suitable for filtering molten aluminum (e.g. weaves No. 53 or 65 of Fibrous Glass Products Incorporated, Spokane, Washington).

Molten aluminum is supplied from a source 11, such as, for example, a tapping crucible. The molten metal flows downward by gravity, passing through and in contact with the aluminum fluoride particles 9, whereby the amount of lithium, sodium and magnesium traces in the metal is substantially reduced. The apparatus is preferably preheated prior to introduction of the molten metal into it.

The following examples serve to illustrate the practice of the invention:

Example 1

Approximately 134 pounds of kiln dried aluminum fluoride particles averaging ¼ inch in diameter were placed in a welded steel apparatus as shown in the drawing, having the dimensions 11.5″ x 32″, provided with a metal partition having ½ inch diameter drainage perforations. The apparatus was filled with the aluminum fluoride particles to a bed depth of 24 inches. The purifying apparatus was placed to discharge into a 1000 pound pig mold, and molten aluminum from electrolytic reduction cells was poured into the preheated apparatus and through the particle bed, to flow into the mold. Samples were taken from the supply ladle before pouring and also from the pig mold after it was filled. All percentages are by weight of the aluminous metal. The results of two runs were as follows:

TABLE 1

| Run No. | $AlF_3$ Bed Depth, Inches | Trace Element | Ladle Analysis, Percent | Mold Analysis, Percent |
|---|---|---|---|---|
| 1 | 24 | Mg | .0015 | .0006 |
|  |  | Na | .0022 | .0004 |
|  |  | Li | .0006 | .0001 |
| 2 | 24 | Mg | .0016 | .0005 |
|  |  | Na | .0023 | .0006 |
|  |  | Li | .0005 | .0001 |

Example 2

Proceeding as in Example 1, there was introduced into the apparatus approximately 67 pounds of like aluminum fluoride particles to form a bed having a depth of 12 inches. The results of the treatment were as follows:

TABLE 2

| Run No. | AlF₃ Bed Depth, Inches | Trace Element | Ladle Analysis, Percent | Mold Analysis, Percent |
|---------|------------------------|---------------|-------------------------|------------------------|
| 1 | 12 | Mg | .0015 | .0008 |
|   |    | Na | .0034 | .0012 |
|   |    | Li | .0006 | .0001 |
| 2 | 12 | Mg | .0023 | .0013 |
|   |    | Na | .0059 | .0021 |
|   |    | Li | .0011 | .0003 |

As can be seen from the examples, the amount of trace elements in the form of lithium, sodium and magnesium after the treatment depends upon the amount before the treatment and the extent of contact with the aluminum fluoride particles. The result to be achieved by the treatment depends on the end use of the aluminous metal, which may be treated in the form in which it comes from the electrolytic reduction cell or in any subsequent alloy form which does not interfere with the treatment. For some purposes none of the trace elements in question appear to cause any difficulties, and there is no need for any treatment to remove them. In the case of aluminous metal to be used in production of dry annealed foil of commercial purity the treatment of the invention should be applied to reduce the amount of lithium to a level below 0.0003 percent, in order to avoid "blue corrosion." In the case of sodium it is more difficult to assign an upper limit, because traces of sodium in aluminous metal in the form in which it comes from the electrolytic reduction cell tend to be reduced by subsequent remelting. However, an upper limit of 0.0005 percent sodium is set in order to avoid "hot shortness" during subsequent hot working of aluminum-magnesium alloys, and the treatment of the invention (before alloying) is useful in reducing trace elements of sodium below this level. The upper limit of magnesium should be 0.001 percent in the case of aluminous metal to be used in production of condenser foil, for purposes of avoiding discoloration and related defects during high temperature annealing of the foil, and the treatment of the invention is useful for this purpose. Reduction of trace amounts of magnesium is also desirable in any foil metal.

While present preferred examples of means and methods of practicing the invention have been illustrated and described, it will be understood that the invention may be otherwise variously embodied and practiced within the scope of the following claims.

What is claimed is:
1. Method for the removal of impurities in the form of trace amounts of metals selected from the group consisting of lithium, sodium and magnesium, from aluminous metal containing such impurities, which comprises passing the aluminous metal in liquid form through a bed consisting essentially of solid aluminum fluoride particles.
2. Method for the removal of trace amounts of lithium from aluminous metal, which comprises passing the aluminous metal through a bed consisting essentially of solid aluminum fluoride particles.
3. The method of claim 2, in which the bed is of sufficient depth to reduce the amount of lithium in the aluminous metal below 0.0003 percent.
4. Method for the removal of trace amounts of sodium from aluminous metal, which comprises passing the aluminous metal through a bed consisting essentially of solid aluminum fluoride particles.
5. The method of claim 4, in which the bed is of sufficient depth to reduce the amount of sodium in the aluminous metal below 0.0005 percent.
6. Method for the removal of trace amounts of magnesium from aluminous metal, which comprises passing the aluminous metal through a bed consisting essentially of solid aluminum fluoride particles.
7. The method of claim 6, in which the bed is of sufficient depth to reduce the amount of magnesium in the aluminous metal below 0.001 percent.
8. The method of claim 1 in which the bed consists predominantly of solid particles having an aluminum fluoride exterior and an alumina core.
9. Means to remove trace elements from aluminous metal, comprising means forming a conduit for liquid aluminous metal, a bed of solid aluminum fluoride containing particles in the conduit, and means extending across the conduit to support the bed of particles while allowing passage of aluminous metal through the conduit, most of said particles having an aluminum fluoride exterior and an alumina core.

References Cited by the Examiner

UNITED STATES PATENTS

| | | | |
|---|---|---|---|
| 845,819 | 3/1907 | Roberts. | |
| 3,025,155 | 3/1962 | Lee et al. | 75—93 X |
| 3,039,864 | 6/1962 | Hess et al. | 75—93 X |

DAVID L. RECK, *Primary Examiner.*

HYLAND BIZOT, *Examiner.*

H. W. TARRING, *Assistant Examiner.*